US012560171B2

(12) United States Patent
Grantham-Hill

(10) Patent No.: US 12,560,171 B2
(45) Date of Patent: Feb. 24, 2026

(54) DRUM UNLOADING STATION WITH IMPROVED LANCE DESIGN

(71) Applicant: Unibloc Hygienic Technologies UK, Ltd., Bolney (GB)

(72) Inventor: Robert George Grantham-Hill, Southwater (GB)

(73) Assignee: Unibloc Hygienic Technologies UK, Ltd., Bolney (GB)

( * ) Notice: Subject to any disclaimer, the term of this patent is extended or adjusted under 35 U.S.C. 154(b) by 0 days.

(21) Appl. No.: 18/912,783

(22) Filed: Oct. 11, 2024

(65) Prior Publication Data

US 2025/0172149 A1 May 29, 2025

Related U.S. Application Data

(60) Provisional application No. 63/603,284, filed on Nov. 28, 2023.

(51) Int. Cl.

| | |
|---|---|
| ***F04D 13/16*** | (2006.01) |
| ***B67D 7/02*** | (2010.01) |
| ***B67D 7/62*** | (2010.01) |
| ***F04D 29/40*** | (2006.01) |

(52) U.S. Cl.

CPC ........... *F04D 13/16* (2013.01); *B67D 7/0288* (2013.01); *B67D 7/62* (2013.01); *F04D 29/406* (2013.01)

(58) Field of Classification Search

CPC ..... B67C 3/30; B67C 3/34; B67D 2001/0825; B67D 1/0802; B67D 7/0288

See application file for complete search history.

(56) References Cited

U.S. PATENT DOCUMENTS

| | | | | |
|---|---|---|---|---|
| 4,162,745 A * | 7/1979 | Anderson, Jr. | ..... | A01M 7/0089 222/464.5 |
| 4,337,802 A * | 7/1982 | Kennedy | ................... | B67C 3/30 141/93 |
| 5,033,492 A * | 7/1991 | Mertens | ..................... | B08B 9/08 134/182 |
| 6,053,219 A * | 4/2000 | Seiver | .................... | G01G 17/06 141/83 |
| 2018/0208453 A1* | 7/2018 | Eggler | ..................... | B67D 7/62 |

FOREIGN PATENT DOCUMENTS

DE 696572 C * 9/1940 ........... B67D 1/0802

OTHER PUBLICATIONS

DE102004024447A1 and machine translation (Year: 2025).*

Machine Translation of Description of DE696572C (Year: 2025).*

* cited by examiner

*Primary Examiner* — Timothy P. Kelly

(74) *Attorney, Agent, or Firm* — Miller & Martin PLLC

(57) ABSTRACT

A drum unloading station has a plurality of lances which can move intermediate stand-by to in-use configurations as well as up and down, preferably pneumatically, electronically, or otherwise as may be directed by a processor. The lances preferably have self-draining tips with ports above a base whereby the base can rest against a bag in a container to prevent the bag from restricting flow through the tip ports. Hub ports may be disposed above the tip ports and provide an outward flow of fluid for at least one of rinsing material from the container towards the tip ports or directing about the lance such as into a scabbard for clean in place convenience.

20 Claims, 6 Drawing Sheets

DRUM UNLOADING STATION WITH IMPROVED LANCE DESIGN

CLAIM OF PRIORITY

This application claims the benefit of U.S. Provisional Patent Application No. 63/603,284 filed Nov. 28, 2023, which is incorporated herein by reference in its entirety.

FIELD OF THE INVENTION

The present invention relates to drum unloading stations and more particularly to drum unloading stations configured to unload fluids from drums stacked adjacently on pallets, such as in a 2×2 arrangement, for at least some embodiments.

BACKGROUND OF THE INVENTION

US Published patent application No. 20230192471 is a drum unloading station which is believed to be an improvement over prior art, and certainly can be effective at its design objectives.

Other drum emptying stations can be as complex as U.S. Pat. No. 5,371,911, or simpler, like U.S. Pat. No. 5,741,108. Competitors such as Murzan at www.Murzan.com make competitive, but different products.

In spite of a number of companies attempting to provide improvements for drum emptying stations, the applicant has discovered a need to provide an improved Drum Unloading Station to the market.

SUMMARY OF THE INVENTION

It is an object of many embodiments of the present invention to provide a drum emptying station having a plurality of lances, whereby at least some of the lances are selectively movable, possibly automatedly, such as rotatable out of an axis extending through a drum location.

It is another object of many embodiments of the present invention to provide a drum emptying station having at least one lance having a self-draining tip which preferably permits fluid to drain from the lance without pooling while simultaneously providing a base, preferably solid, to retain bags or other material in the drums so as not to sucked into the lance when emptying the drum.

It is yet another object of many embodiments of the present invention to provide a rinse ring disposed radially externally of the lance which preferentially dislodges product against the sides of the drum/bag to direct the product toward the lance inlet for emptying the drum.

BRIEF DESCRIPTION OF THE DRAWINGS

The particular features and advantages of the invention as well as other objects will become apparent from the following description taken in connection with the accompanying drawings in which.

DETAILED DESCRIPTION OF THE PREFERRED EMBODIMENTS

The Figures show a drum unloading station 10 of a presently preferred embodiment of the present invention. While other drum unloading stations of various constructions exist in the marketplace, this particular design is believed to have novel features that make it particularly attractive for many applications.

Figure 1:
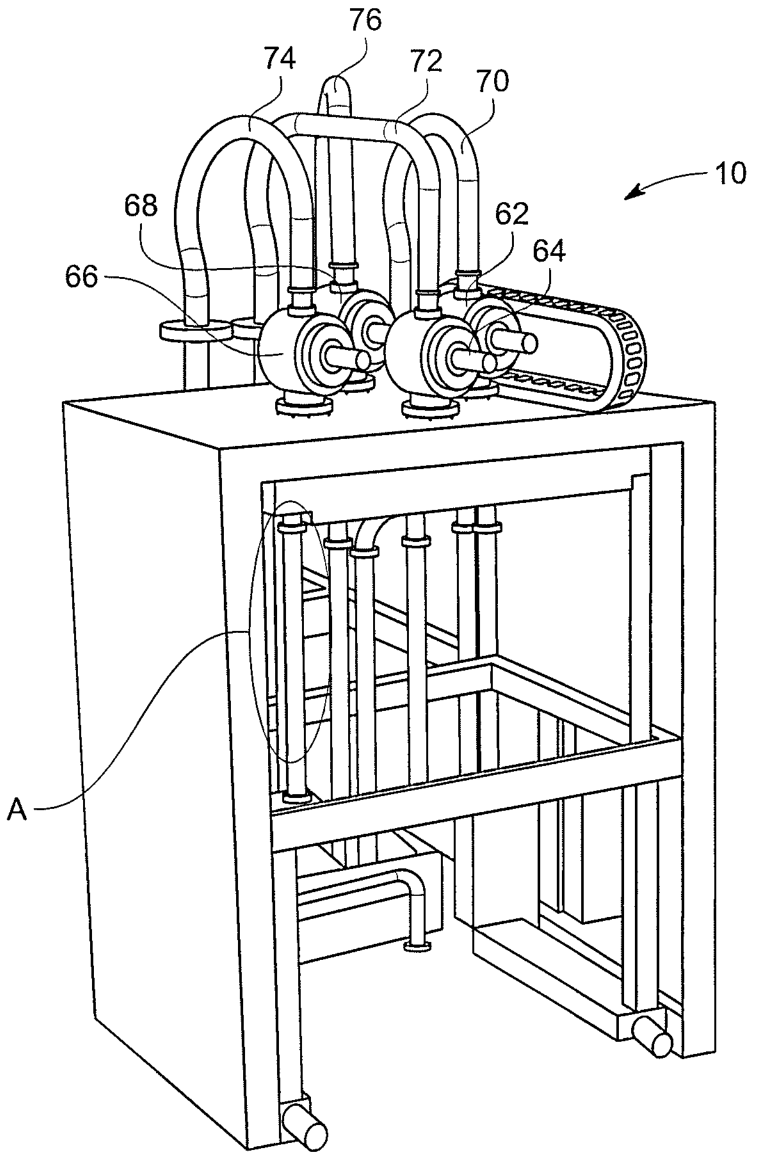
FIG. 1 is a front perspective view of a drum unloader of a presently preferred embodiment of the present invention.
Figure 2:
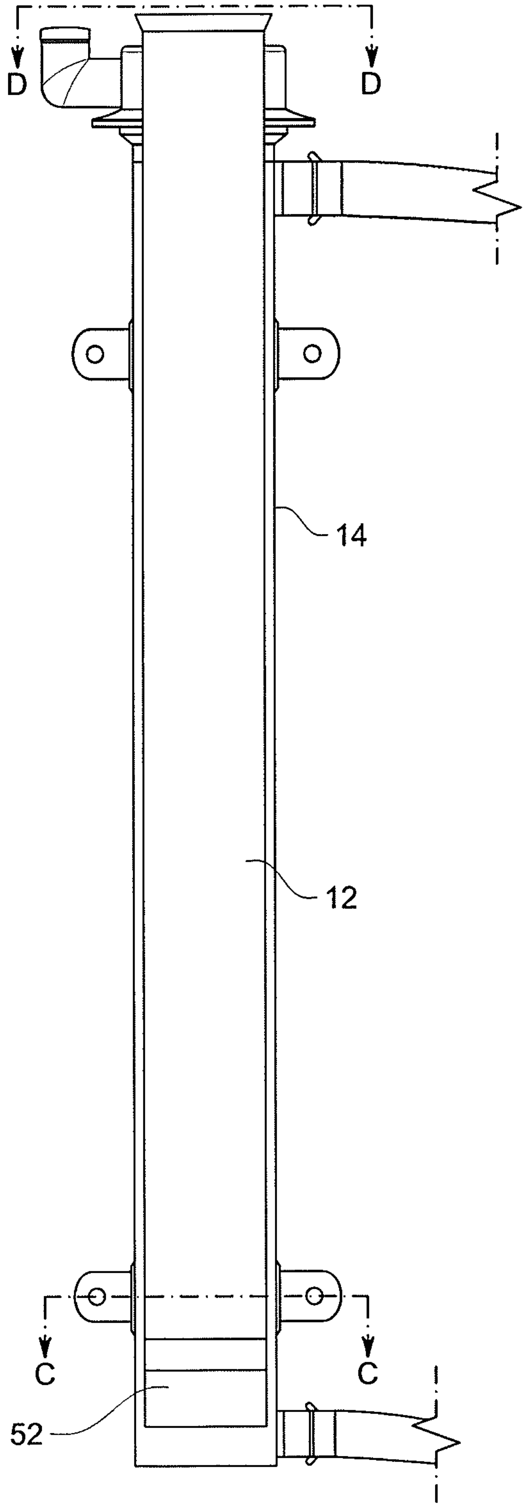
FIG. 2 is a cutaway view of detail A of a lance shown in FIG. 1.
Figure 3:
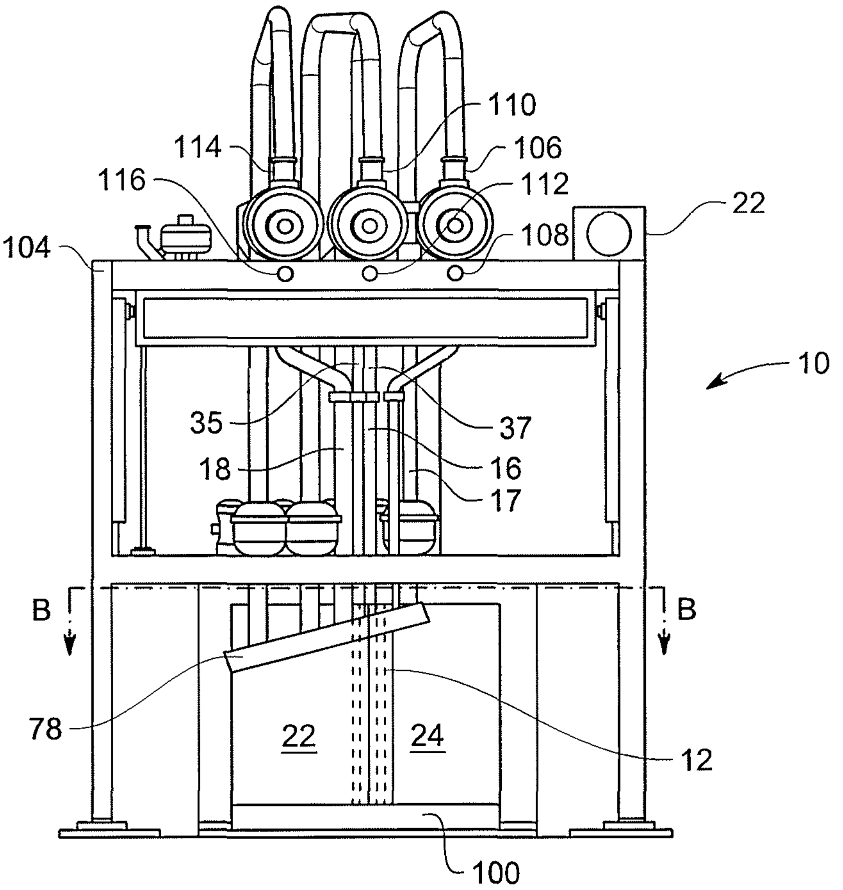
FIG. 3 is a side plan view of the drum unloader shown in FIG. 1 with lances in in raised configurations.
Figure 4:
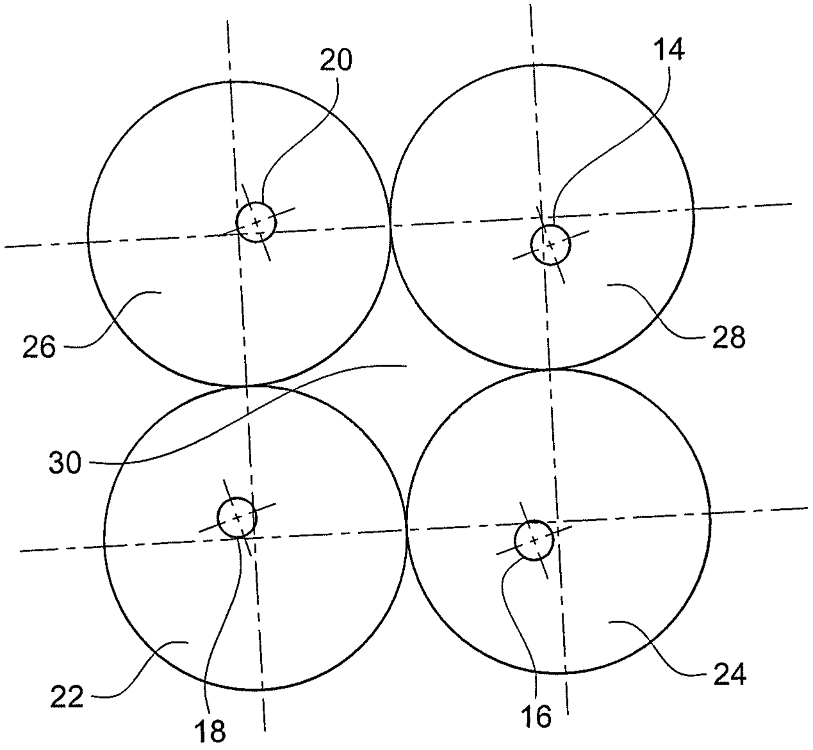
FIG. 4 is a top plan view taken along the line B-B of FIG. 3 with all four lances in an in-use configuration.
Figure 5:
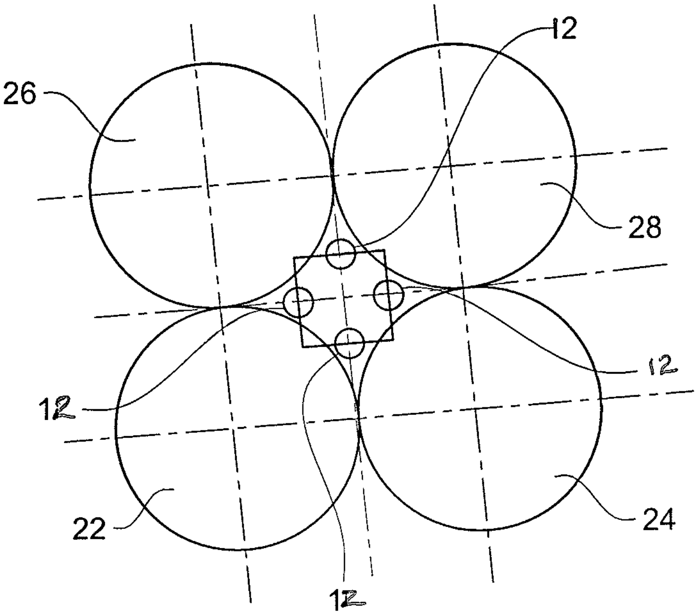
FIG. 5 is top plan view similar to FIG. 4 with all four lances in a stand by configuration.
Figure 6:
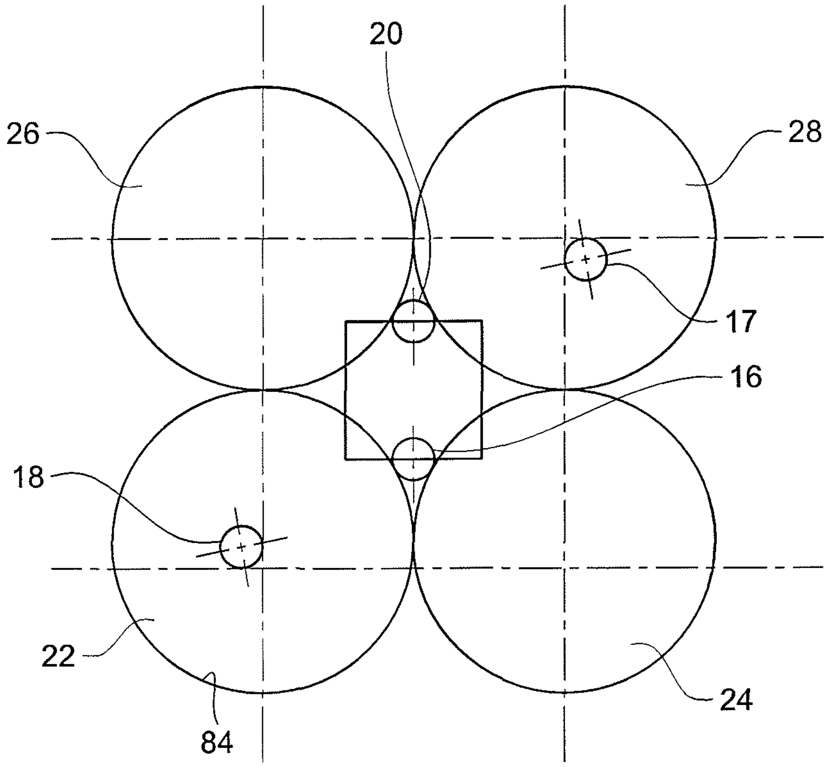
FIG. 6 is a top plan view similar to FIGS. 4 and 5 with two of the four lances in the in-use configuration, and two of the four in a stand by configuration.

This particular drum unloading station 10 has a plurality of lances 12, shown in FIG. 2, which can each be disposed in scabbards 14. The scabbards 14, may be utilized for a clean in place (CIP) process. They are removed for in-use and stand-by configurations. The lances 12 may be controlled by a processor 22 shown in FIG. 3. Processor 22 could be a portion of a control system such as a pneumatic, electronic or other control system. In FIG. 3, the lances 12 are all shown in stand-by configurations so that when the lances 12 extend downwardly, they do not enter an internal volume of any of the containers 22,24,26,28, but instead extend into a location, such as central location 30, which is external to any of the containers 22,24,26,28. Lances 12 not intended to remove material from any container 22,24,26,28 rotate to the left or right hand side of respective containers 22,24,26,28 so as not to be above the various containers 22,24,26,28 when in the stand-by configuration.

Rotating unions 32,34,36,38 may be connected to the lances 12 so that when a selector switch/processor 22 is activated or instructed as appropriate, any or all of the lances 12 may be positioned above specific drums or containers 22,24,26,28. When any of the lances 12 are not required, the specific lance 12 may be directed to a location, such as central location 30, so the lance 12 may still be lowered, but not within a volume of a drum or container 22,24,26,28. The rotation unions 32,34,36,38 may be positioned pneumatically by extending or retracting a pneumatic cylinder or otherwise.

Figure 7:
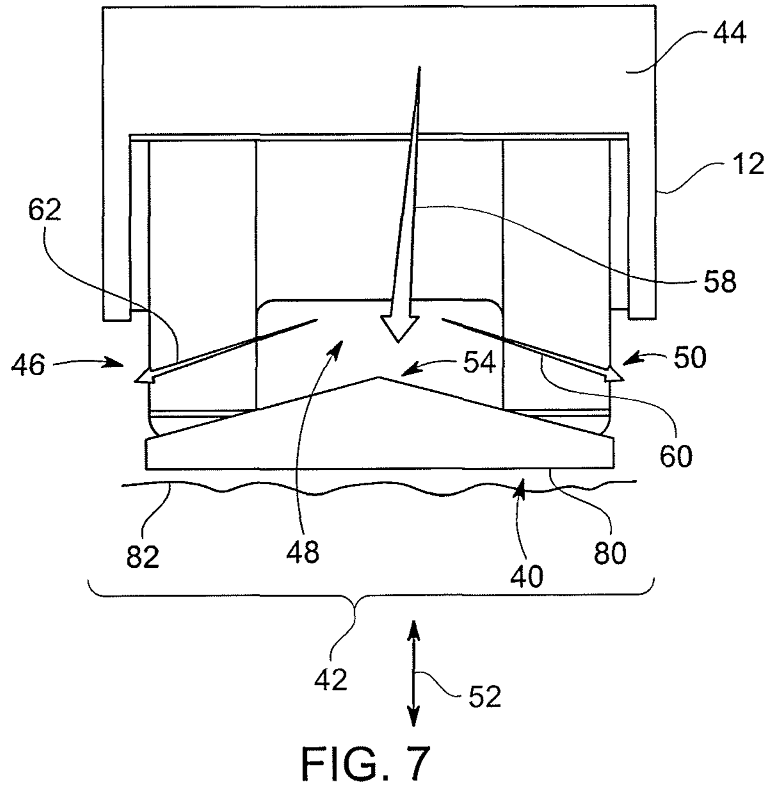
FIG. 7 is cross sectional view taken along the line C-C of the lance shown in FIG. 2.

FIG. 7 shows a tip 40 of the lances 12 for many preferred embodiments. The tip 40 may have a self-draining design and may, for many embodiments, and possibly be machined from a single piece of material. The tip 40 has a base 42, such as a solid base, which extends for much of the width 42 of the lance 12. Tip 40 may be connected to lance body 44 as illustrated. Tip 40 has tip ports 46,48,50 52, which permit radial access into and out of the tip 40, while the base 42 prevents fluid communication from an axial direction 52 through the base 42, for many embodiments, instead pulling fluid from radially directions relative to axial direction 52. The base 42 may have an upwardly directed director 54 onto which fluid (illustrated by red arrows 56,58,60) may be downwardly directed when the lance 12 self drains after use out of the ports 46,48,50,52. When unloading drums, fluid flows oppositely of the arrows 56,58,60 from radially outwardly of the tip 40, through tip ports 46,48,50,52 as directed by suction from the appropriate pump 62,64,66,68, either to individual outlets 70,72,74,76 and/or to a manifold 78 for further use.

Director 54 may be conical or otherwise shaped, for many embodiments so as to potentially assist in directing fluid out of tip ports 46,48,50,52. For containers 22,24,26,28 having bags 82 therein containing product, the bottom 80 of tip 40 may be useful to contact the bag 82 to prevent portions of the bag 82 from being sucked into the lance 12 when emptying a drum or other container 22,24,26,28, particularly when the container 22,24,26,28 is a metal drum with a bag of product therein.

When unloading drums, there are situations in which rinsing the internal walls of drums such as internal wall 84 would be desirable. Rinsing can be done to ensure that a maximum yield of product can be achieved while also potentially minimizing wastage. Other advantages of rinsing may be achieved as well.

For thick, viscous products, some product may stick to the internal wall 84 of the container 22,24,26,28 and/or bag 82. Rinsing the internal wall 84 of the container 22,24,26,28 and/or bag 82 may assist in at least reducing waste. As the product mixes and/or is discharged from the internal wall 84, it is directed toward the bottom of the container 22,24,26,28 where the lance 12 may pump a product mix and/or product out of the drum or other container 22,24,26,28.

Water, such as clean water, or other fluid, may be obtained from a source 86 such as a water supply of the building housing the drum emptying station 10, which may be directed about a hub 92 which may circumnavigate the lance 12, as illustrated, or not. The hub 92 preferably has a plurality of hub ports 88,90 (more would likely exist, but are obscured with the cross sectional view shown), from which the water may be directed by controller or processor 22 in communication with valve 94 to selectively turn the valve 94 on and off for desired amounts of time and/or flow. It is anticipated that while or after the rinsing water is discharged from the hub ports 88,90, the lance 12 pumps product towards outlet 70,74,76, or 78, as appropriate, to empty or continue emptying the drum or container 28. The hub 92 may act as a fluid jacket about the lance 12 with the hub ports 88,90, etc. appropriate directed radially, and downwardly away therefrom. The hub ports 88,90 may be below a Tri-clamp ferrule 102 which may connect to CIP scabbards to assist in being part of a clean in place system, or not.

Figure 8:
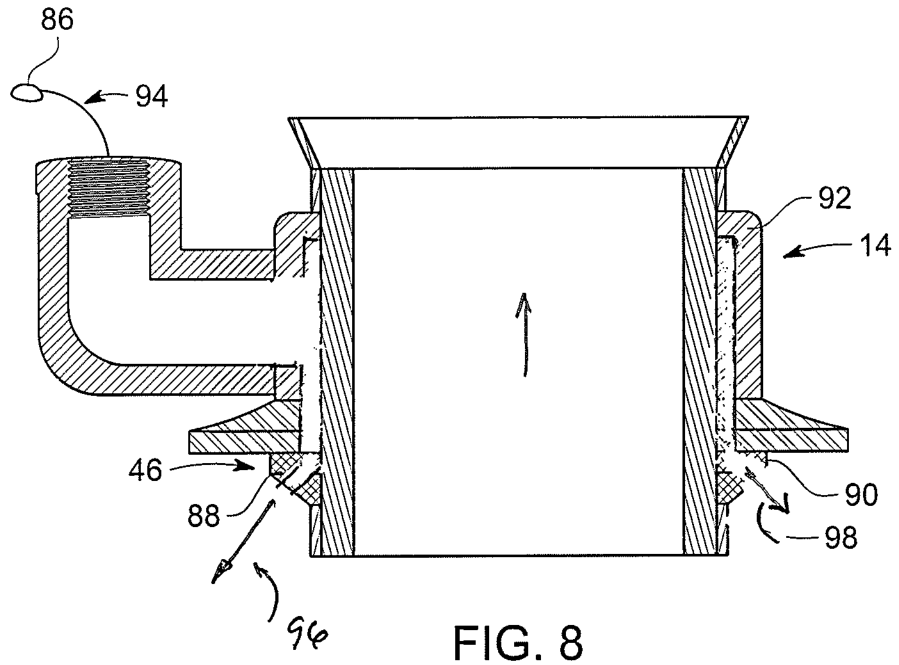
FIG. 8 is a partial cross sectional view taken along the line D-D of the structure shown in FIG. 2.
Figure 9:
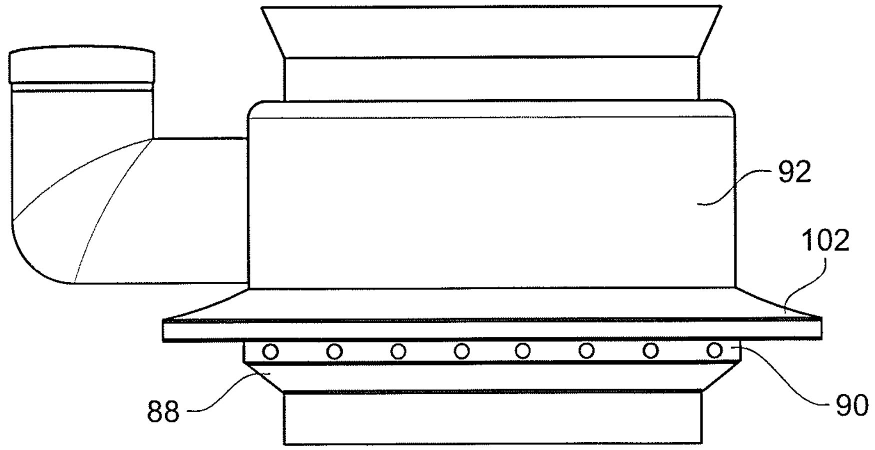
FIG. 9 is a plan view of the portion shown in FIG. 8.

Arrows 96,98 show the fluid, such as water, being used to rinse in FIG. 8. The arrows 96,98 may reflect the angle of the ports 88,90 so that fluid is downwardly and outwardly directed relative to lance 12 such as at an angle of about 30 to about 60 degrees relative to axis 52, and more particularly about 45 degrees relative to axis 52 so as to at least relatively, if not up to most, efficiently direct product from internal walls 84 downwardly to be sucked into lance 12 to assist in emptying the drum or other container 28.

The drum unloading station 10 preferably receives containers 22,24,26,28 on a standard sized pallet 100. The drum unloading station 10 has the ability for many embodiments to select which of the drums or containers 22,24,26,28 to unload, or not, so as to meet production requirements.

Four pumps 62,64,66,68 are shown mounted on a frame 104. Air operated double diaphragm (AODD) pumps are illustrated. Other pumps may be utilized with other embodiments. Processor 22 may provide signals to valves 106,108, 110,112,114,116 and/or others, such as actuated ball valves to open when specific pumps 62,64,66,68 are to be placed in operation, and preferably closed, when not in operation so that product does not flow in undesired flow paths, such as back through unused pumps or other undesired directions.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A drum emptying station comprising:

(a) a plurality of lances operably controlled by a processor, said lances operable intermediate an up and down position as well as an in-use configuration and a stand-by configuration, whereby when in the in-use configuration a selected lance of the plurality of lances is located at least partially above a container to be emptied, and when in the stand-by configuration, the selected lance of the plurality of lances is located radially external to a volume of the container to be emptied, and each of the plurality of lances independently operable relative to one another between the in-use and stand-by configurations;

(b) wherein the processor selectively directs movement of a bottom tip of any of the plurality of lances intermediate the up and down positions in the in-use and stand-by configurations; and (c) wherein the processor selectively directs movement of any of the plurality of lances intermediate the stand-by and in-use configurations.

2. The drum emptying station of claim 1 wherein the movement of the selected lance from the stand-by to the in-use configuration is through rotation.

3. The drum emptying station of claim 2 wherein the rotation occurs at least partially at a union so as to locate a bottom tip of the lance above the volume of the container to be emptied.

4. The drum emptying station of claim 2 wherein the movement of the bottom tip of each lance intermediate the up and down positions uses pneumatics.

5. The drum emptying station of claim 1 wherein the bottom tip of each of the plurality of lances has a solid foot extending at least about a width of each of the plurality of lances, and ports on a side surface of each of the plurality of lances above the foot, with the foot preventing axial fluid flow at a base.

6. The drum emptying station of claim 5 wherein the ports on the side surface of each of the plurality of lances are radially directed tip ports.

7. The drum emptying station of claim 6 wherein each of the plurality of lances is self-draining from the tip ports when not in use.

8. The drum emptying station of claim 7 further comprising a director above the base assisting in directing fluid from the tip ports.

9. The drum emptying station of claim 8 wherein the director is upwardly directed.

10. The drum emptying station of claim 9 wherein the director is conically shaped.

11. The drum emptying station of claim 5 further comprising a director above the base assisting in directing fluid from the tip ports.

12. The drum emptying station of claim 11 wherein the director is upwardly directed.

13. The drum emptying station of claim 12 wherein the director is conically shaped.

14. The drum emptying station of claim 5 further comprising a hub about at least a portion of each of the plurality of lances, said hub having externally directed hub ports, said hub ports connected to a fluid supply whereby the fluid is selectively dispensed from the hub ports while any of the plurality of lances is sucking fluid up through the tip ports.

15. The drum emptying station of claim 14 wherein the fluid directed from the hub ports is selectively controlled by the processor.

16. The drum emptying station of claim 15 wherein the hub ports direct fluid one of at least radially outwardly relative to each of the plurality of lances and downwardly.

17. The drum emptying station of claim 16 wherein the hub ports direct fluid flow intermediate an angle of 30 to 60 degrees relative to an axis extending through each of the plurality of lances.

18. The drum emptying station of claim 16 further comprising a ferule above the hub ports, said ferrule selectively connecting to a scabbard which extends about each of the plurality of lances facilitating clean-in-place of each of the plurality of lances.

19. The drum emptying station of claim 16 wherein each lance is coupled to a pump dedicated to each of the plurality of lances.

20. The drum emptying station of claim 19 wherein each of the pumps is an air operated double diaphragm pump.

* * * * *